Patented Oct. 19, 1943

2,332,423

UNITED STATES PATENT OFFICE 2,332,423

PROCESS OF ENAMELING

Carl H. Zwermann, Jr., Robinson, Ill.

No Drawing. Application September 30, 1939, Serial No. 297,416

8 Claims. (Cl. 106—48)

This invention relates to improvements in Process of enameling.

This invention relates to the art of enameling and particularly to enamel and the method of eliminating tearing in the same.

Enamels consist of opacifiers or colors, a floating agent or binder such as clay, and a frit which comprises a low melting point glass. In making the enamel, the frit may be smelted either with or without an opacifier after which it is ground to the desired fineness.

Heretofore finely milled frit has not been employed in making enamel because it has been necessary to employ relatively large quantities of water to make the enamel suitable for application and the enamel made with finely milled frit has torn or shrunk during firing. It has been common practice to prevent tearing by using relatively coarse frit ground to a fineness such that 1 or 2% by weight is retained on a #200 sieve, i. e., one which has openings of 72 microns, although it has been found that the addition of ¼ to ½% sodium nitrite will prevent tearing even if frit ground to a fineness such that 1% by weight will be retained on a #325 sieve, i. e., one which has an opening of 44 microns, is used.

I have found that tearing in enamel may be prevented if the ground frit mass is shrunk by heating before the application of the enamel. Tearing is prevented by this treatment even if finely ground frit heretofore considered unsuitable for enamel is subjected to such treatment. It is very advantageous to use finely ground frit because it is possible to obtain a more even distribution of the opacifier in the enamel and I have found that the more even distribution of the opacifier may be obtained if the opacifier is mixed with the finely ground frit which is then subjected to the action of heat even to the point of fusion of the frit. With enamels thus made, it is possible because of the uniform distribution of the opacifier to obtain desired opacity with much thinner applications of enamel than had been formerly used.

The objects of this invention are:

First, to provide a new and improved process of producing enamel.

Second, to provide such a process which produces an enamel capable of giving highly satisfactory coverage in coats relatively thinner than has heretofore been the case, said coats having extremely high light reflection.

Third, to provide a method of producing such an enamel which will not be subject to tearing during firing.

Fourth, to provide such a method which is simple and inexpensive and which assures the most uniform possible distribution of the opacifier in the frit.

Fifth, to provide a method for eliminating or greatly reducing the possibility of tearing during the firing of enamel.

Sixth, to produce a new and improved frit.

Seventh, to produce a new and improved enamel or mill batch having the above mentioned desirable properties.

Other objects and advantages pertaining to details and economies will appear from the description to follow.

In carrying out my invention, I employ as a frit any suitable low melting point glass, preferably such a glass as may be smelted at approximately 2000° F. After the frit has been smelted, it is ground in a ball mill to produce a very fine material. I prefer to produce a frit in which particles of a size below four microns predominate. I produce this frit by continuing the grinding to a point beyond that heretofore considered possible.

Heretofore the finest frit used in practice has been that ground in a ball mill until only 1% by weight of the frit is retained upon a #325 sieve which has openings of 44 microns. I continue the grinding operation beyond the point for producing such frit and thereby produce a product comprising predominantly particles of a size less than four microns. Of course some of the particles are larger than four microns as is the case in hitherto employed frits, but the predominant material is smaller than the predominant material of hitherto employed frits.

After grinding the frit, it is thoroughly mixed with the opacifier which is finely divided. I may employ such opacifiers as cerium oxide, tin oxide, titanium oxide or zirconium oxide and in this specification, when referring to opacifiers I wish it to be understood that I also include colors such as those now commonly employed and which are known to the trade as color oxides. The above specifically mentioned opacifiers are of very small size, being of the order of about a micron in size, although in certain opacifiers and colors the size may run somewhat larger. The mixing operation may be carried on in a ball mill and I prefer to use from 5 to 25 parts by weight of one or more opacifiers to 100 parts by weight of frit.

After thoroughly mixing the finely divided frit and the opacifier which become intimately mixed because of the fineness of the particle sizes, I subject the mixture to a heat of from 1100° to 1400°

F. for a period of about one hour. This treatment softens the frit so that surface tension rounds off the sharp projections on the particles of the frit, reducing the overall dimension of the particles and in effect shrinking the frit, thus causing the frit in the final enamel to pack more closely than would be the case if the frit had not been shrunken by this sintering operation and assisting materially in reducing tear in the final enamel during drying or firing.

The temperature may be higher or lower, depending entirely upon the composition of the frit.

I have found that a highly desirable frit and enamel may be obtained if the sintering operation is carried on prior to the mixing of the frit and the opacifier, but I prefer to carry on the sintering operation afterward because better results are obtained if the mixing occurs prior to sintering.

In the preferred form of my invention, I use the very fine frit in which particles of a size below four microns predominate. I have found, however, that materially improved results with respect to tearing are obtained even if more coarsely ground frit is employed if it is subjected to the shrinking treatment above described. Enamel made with frit having particles up to 44 or even 72 microns predominating will be improved by this treatment with respect to tearing.

I have found that it is possible to obtain highly satisfactory results even if the heating operation is carried on to any degree from a light sintering to the extent of completely fusing the finely divided frit in the mixture of frit and opacifier and that if the fused mass of frit and opacifier thus shrunken is re-ground to standard fineness in which the predominant largest particles for instance run up to 44 microns, or even 72 microns, the enamel is highly desirable because the opacifier is evenly distributed throughout the frit in a manner much superior to that obtained either by adding the opacifier to more coarsely ground frit or to the raw materials employed in the smelting operation.

The frit and opacifier may be mixed with any suitable binder such as clay and the mill batch resulting is then mixed with sufficient water to give it the desired consistency for application.

I have found that if instead of clay or other binders I employ from 2 to 6% of bentonite, I obtain an enamel which is particularly free from tearing and which will withstand extremely rough handling after drying and before firing. Such an enamel is superior to that in which the clay or other binder is employed and because of the fineness of the frit, I am able to employ larger quantities of bentonite than could be employed with the more coarsely ground frit.

I have found that it is possible, employing extremely finely divided frit and the bentonite in the relationship of 100 parts of frit to from 2 to 6 parts of bentonite, to obtain coverage and opacity highly satisfactory for certain usages without employing any opacifier and in some cases I prefer to use such an enamel.

I have found that in some instances it is desirable to add to 100 parts of the enamel about ½ part of sodium nitrite. This tends to prevent tearing and improves the gloss of the surface of the enameled products to which the enamel is applied.

I have found that an enamel in which 100 parts of frit, 25 parts of cerium oxide, 5 parts of bentonite and ½ part of sodium nitrite, all by weight, are employed, I obtain a light reflectance of 70% in a coating of 10 grams per square foot, whereas if coarser ground frit is used, I obtain a reflectance of less than 40%. With a coverage of 20 grams per square foot, the frit of my invention gave more than 80% reflectance, whereas the coarser frit gave less than 55% reflectance.

I have found that with an enamel made with 100 parts by weight of frit and 25 parts by weight of titanium oxide, the results are substantially the same for the finely milled frit.

In an enamel containing 100 parts by weight of the frit of my invention and 25 parts by weight of tin oxide, the reflectance is 50% with a coverage of 10 grams per square foot, whereas with the coarser ground prior art frit, the reflectance is approximately 35%. In the same enamel with 20 grams per square foot coverage, the reflectance when the frit of my invention is employed is approximately 67½% whereas the coarser ground prior art frit gave only 50% reflectance.

The coarsely ground frits referred to in the above examples contained predominantly particles up to 44 microns in size as compared with the particles up to 4 microns or less in my improved frit.

As I have already pointed out, when my frit is employed greater opacity is obtained because of the uniform distribution of the opacifier and because of the formation of small bubbles in the finished enamel in greater numbers than is the case when the coarsely ground frit is employed.

Enamel made in accordance with my invention gives highly satisfactory coverage and reflectance in very thin layers and the enamel is not subject to any material tearing during drying or firing.

I have found that where in many instances using prior art enamels it was necessary to apply two coats to obtain the desired coverage and reflectance, I can obtain the same results with a single coat of enamel.

I have described several different modifications of my process and product. It will be apparent that variations can be made and that such variations will give highly desirable and satisfactory results. I do not wish to be limited to the specific method and product above described. When I refer to enameling, I do not wish to be limited merely to the application of enamel coatings such as I described to metal bases.

The terms and expressions which have been herein employed are used as terms of description and not of limitation, and there is no intention, in the use of such terms and expressions, of excluding any equivalents of the features shown and described, or portions thereof, but it is recognized that various modifications are possible within the scope of the invention claimed.

Having thus described my invention, what I claim as new and desire to secure by Letters Patent is:

1. The method of making enamel comprising the steps of grinding vitrified frit to produce a product comprising predominantly particles of a size less than four microns, intimately mixing finely divided opacifier, and heating the mixture sufficiently to merely soften the frit particles to permit the surface tension thereof to reduce the overall size thereof.

2. The method of making enamel comprising intimately mixing finely divided opacifier and vitrified frit comprising predominantly particles of a size less than four microns, and heating the mixture sufficiently to merely soften the frit particles to permit the surface tension thereof to reduce the overall size thereof.

3. The method of making enamel comprising intimately mixing finely divided opacifier and vitrified frit comprising predominantly particles of a size less than four microns, and heating the mixture sufficiently to produce a shrinkage of the frit particles.

4. The method of rendering vitrified frit comprising predominantly irregular particles so fine as to be unsuitable for enameling because of tearing suitable therefor, comprising heating the frit to soften the particles thereof to permit surface tension to reduce the overall size of said particles.

5. In the method of making enamel, the steps comprising uniformly distributing finely divided opacifier throughout vitrified frit comprising predominantly particles so fine as to be unsuitable for enameling, then heating the mixture to fuse the frit, and then grinding the fused mass to a fineness suitable for enameling.

6. A mill batch for enameling comprising vitrified frit comprising predominantly particles of a size of less than four microns having rounded surfaces, an opacifier, and bentonite.

7. A mill batch for enameling consisting of 100 parts by weight of vitrified frit comprising predominantly particles of a size of less than four microns having rounded surfaces, 5 to 25 parts by weight of opacifier, and 2 to 6 parts of bentonite.

8. A mill batch for enameling consisting of 100 parts by weight of vitrified frit comprising predominantly particles of a size of less than four microns having rounded surfaces, and 2 to 6 parts of bentonite.

CARL H. ZWERMANN, Jr.